(12) United States Patent
Burns

(10) Patent No.: US 6,493,631 B1
(45) Date of Patent: Dec. 10, 2002

(54) GEOPHYSICAL INERTIAL NAVIGATION SYSTEM

(75) Inventor: Alan Alexander Burns, Portola Valley, CA (US)

(73) Assignee: MLHO, Inc., Portola Valley, CA (US)

( * ) Notice: Subject to any disclaimer, the term of this patent is extended or adjusted under 35 U.S.C. 154(b) by 0 days.

(21) Appl. No.: 10/158,728

(22) Filed: May 30, 2002

Related U.S. Application Data

(60) Provisional application No. 60/294,930, filed on May 31, 2001.

(51) Int. Cl.$^7$ .............................................. G06F 165/00
(52) U.S. Cl. ........................ 701/220; 701/221; 701/207
(58) Field of Search .................................. 701/200, 220, 701/221, 207; 244/166, 171; 73/178 R; 340/988, 995

(56) References Cited

U.S. PATENT DOCUMENTS

| | | | |
|---|---|---|---|
| 5,235,514 A | * 8/1993 | Matsuzuki | 341/995 |
| 5,272,639 A | 12/1993 | McGuffin | |
| 5,319,561 A | 6/1994 | Matsuzaki | |
| 5,339,684 A | 8/1994 | Jircitano et al. | |
| 5,455,591 A | * 10/1995 | Hzi | 342/185 |
| 5,912,643 A | 6/1999 | Chew et al. | |
| 6,208,936 B1 | 3/2001 | Minor et al. | |

* cited by examiner

Primary Examiner—Richard M. Camby

(57) ABSTRACT

An inertial navigation system employs geophysical (earth's magnetic and gravity) field sensors to measure body rotations of an aircraft or other vehicle. In effect, these replace expensive laser ring gyros used in conventional inertial navigation systems. The vector components of the geomagnetic field may be incorporated directly into the state vector describing the vehicle's attitude, acceleration, velocity, and position. A predictive filter (e.g. Kalman) operates on measured and predicted geophysical field components and on-board accelerometers. Predicted geophysical field components are obtained from maps and/or models of the earth's magnetic and gravity fields.

14 Claims, 3 Drawing Sheets

GEOPHYSICAL INERTIAL NAVIGATION SYSTEM

CROSS-REFERENCES TO RELATED APPLICATIONS

This application claims the benefit of Provisional Patent Application Ser. No. 60/294,930 filed May 31, 2001.

BACKGROUND—FIELD OF INVENTION

This invention relates to inertial or dead reckoning navigation, in particular to that of aircraft.

BACKGROUND—DESCRIPTION OF PRIOR ART

There is a need for a low-cost navigation system to act effectively and inexpensively as a backup in the vent of failure to receive and process reliable Global Positioning System (GPS) navigation signals. This is particularly important for single-engine General Aviation (GIA) applications, where cost is often the overriding consideration. The United States Government is planning to phase out existing ground-based navigation systems—the VOR (VHF Omni-Directional Range) and typically associated DME (Distance Measuring Equipment) network, the ILS (Instrument Landing System), and non-directional beacons (NDE). Replacing these legacy systems with GPS will realize considerable cost savings. However, this transition leads to the need for a reliable, autonomous, and inexpensive backup system should the GPS signals or airborne GPS receiving equipment be lost or compromised. For national security reasons, the Government may at any time re-impose Selective Availability (S/A), whereby the GPS accuracy is deliberately degraded. Continuation of safe flights under Instrument Meteorological Conditions (IMC) with only GPS capability would be impossible. Scheduled airline aircraft are typically equipped with inertial navigation systems (INS), which would be available as a backup. Modern INS generally use expensive optical fiber gyros. However, existing INS are too costly for typical G/A installations, particularly those involving light, piston-powered aircraft. Furthermore, a backup system must operate without any external signals or sensors. There is no guarantee that any particular ground-based dedicated or chance radiator or group of radiators will be available in an emergency. Under IMC, there is also no guarantee that usable surface features will be visible and identifiable, even with advanced terrain and feature recognition devices.

Conventional INS employ a combination of accelerometers and rotation sensors. Modern strapdown INS use laser optical gyros to sense rotation.

U.S. Pat. No. 5,272,639 to McGuffin teaches a terrain reference navigation system was that extended the then prior art of terrain aided INS by incorporating gravity and geomagnetic field data as well. The then prior art used radar and barometric altimeters to compare measured ground elevation to that stored essentially as a topographical map. To this the method described in U.S. Pat. No. 5,272,639 added maps of the gravity and geomagnetic fields. Thus measurements of the local gravity and geomagnetic fields were to be correlated to map data to update and correct the INS position. The INS was otherwise conventional. In my present invention the conventional INS and elevation measuring equipment are eliminated completely.

U.S. Pat. No. 5,319,561 to Matsuzaki teaches a system for determining the instantaneous heading of a vehicle using geomagnetic and turning rate sensors. The latter sensors may be gyroscopic (including mechanical and optical gyroscopes) or wheel sensors. The primary object of this invention is to correct for magnetic compass errors in vehicle heading determination.

U.S. Pat. No. 6,208,936 to Minor and Rowe teaches the use of a geomagnetic field sensor and knowledge of the local geomagnetic field to determine the rotation of a spinning vehicle (such as a rocket) to computationally de-spin the navigation solution for a MEMS-IMU/GPS (Micro-Electro-Mechanical—Inertial Measurement Unit) navigation system and thus maintain a stable solution.

SUMMARY

In accordance with the present invention a geophysical INS (Inertial Navigation System) comprises a set of sensors that are strapped down to a vehicle such as an aircraft and are responsive to the geomagnetic field and to gravity and vehicle acceleration. Changes in the sensed magnetic field components and vehicle acceleration components are the input state variables for a predictive filter, such as a Kalman filter, whose outputs are used to estimate the velocity and geographical location of the vehicle. In effect, magnetic field sensors replace the gyroscopes in a conventional INS. Stored magnetic and gravity field data (e.g., maps) then provide new values of the local geophysical parameters. The system is intended primarily to be a low-cost stand-alone backup for navigation systems such as GPS (Global Positioning System).

Objects and Advantages

Accordingly, the overall object and advantage of this invention is to provide a lower cost means for inertially navigating a vehicle such as an aircraft than provided by an INS using mechanical and optical gyroscopic rotation sensors.

Another object and advantage of this invention is to provide a stand-alone backup means for navigating aircraft and other vehicles in the event of failure or degradation of the GPS.

A further object and advantage of this invention is to provide inertial navigation capability to light aircraft.

Still further objects and advantages will become apparent from a consideration of the ensuing description and accompanying drawings.

DRAWING FIGURES

Figure 1:
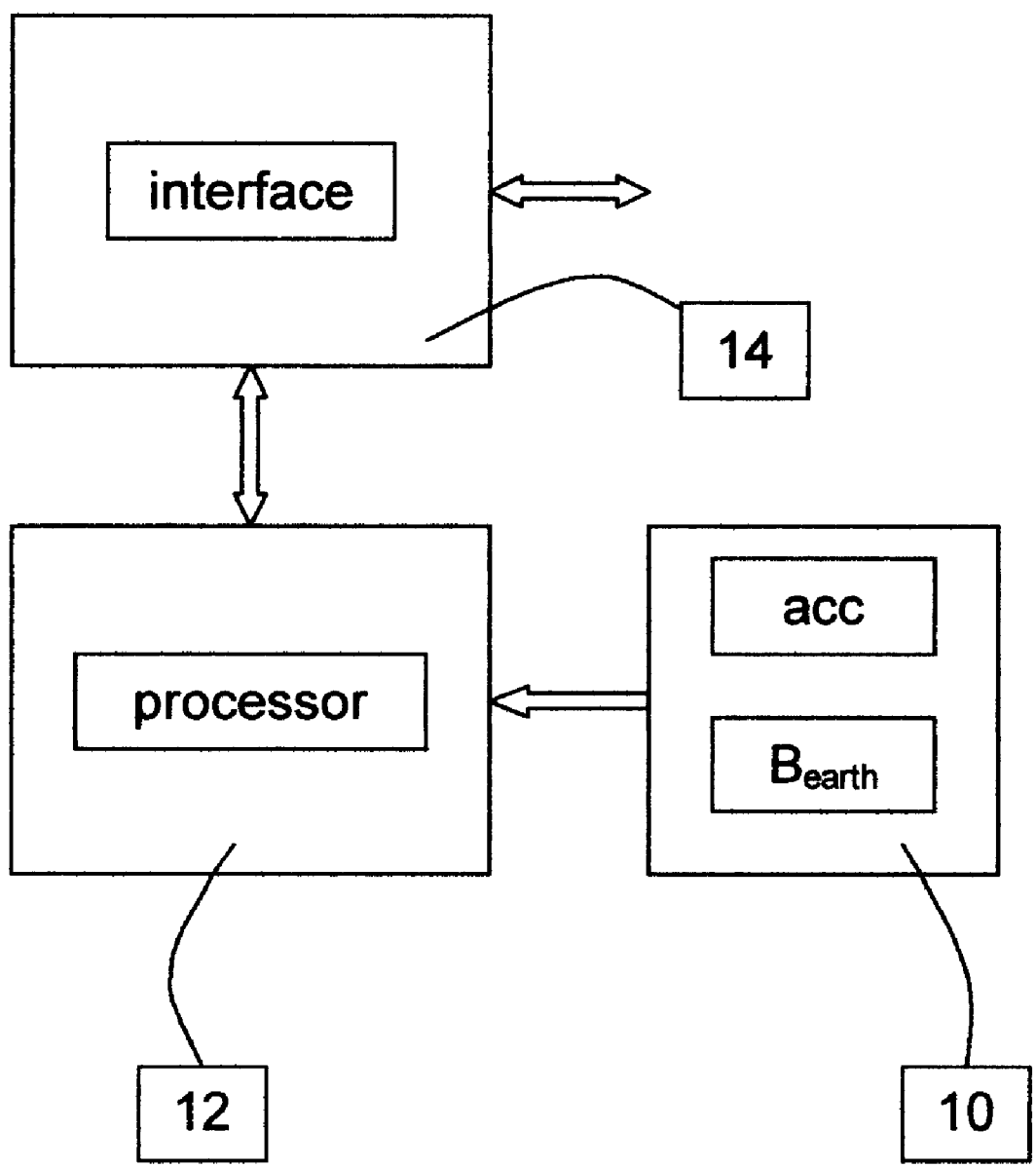
FIG. 1 is a block diagram of the geophysical inertial navigation system.

REFERENCE NUMERALS IN DRAWINGS 10 processor unit
12 acceleration and geophysical field sensor unit
14 interface unit
16 x-axis accelerometer
18 x-axis geophysical field sensor
20 y-axis accelerometer
22 y-axis geophysical field sensor
24 z-axis accelerometer
26 z-axis geophysical field sensor
28 signal outputs 30 acceleration and geomagnetic field sensors
32 Kalman filter process
34 predicted state change vector
36 vehicle (aircraft) state change vector
38 dead-reckoning navigation process
40 acceleration vector and attitude changes
42 vehicle (aircraft) attitude estimate
44 vehicle (aircraft) velocity and position vector
46 gravity and geomagnetic field vectors
48 vehicle- (aircraft-) referenced geophysical vector components
50 GPS (Global Positioning System) navigation data
52 other on-board data sources DESCRIPTION AND OPERATION
Preferred and Additional Embodiments FIG. 1 is a block diagram showing the primary elements of a geophysical inertial navigation system. The primary elements are a processor unit 10, an acceleration- and geomagnetic-field sensor unit 12, and an interface unit 14. In the preferred embodiment, the geophysical quantities sensed are the direction and strength of the geomagnetic field and the direction and strength of the earth's gravity. Sensor unit 12 is strapped down to the body (not shown) of the vehicle (aircraft), and may or may not be, integrated into the same package as the processor unit 10 and interface unit 14. In some applications, it would be advantageous to mount sensor unit 12 remotely from the processor and interface units 10 and 14. The components of sensor unit 12 may be separated as well. For example, mounting the sensor unit 12 in the tail of an aircraft or at a wingtip would reduce any interfering effects of magnetic fields form on-board objects and electrical currents. In addition, processor unit 10 and interface unit 14 may alternatively be separated physically or be combined in the same package. The function of interface 14 is to communicate inputs and outputs with external equipment to and from processor 10. Interface 14 may also comprise tactile and visual inputs or outputs.

Figure 2:
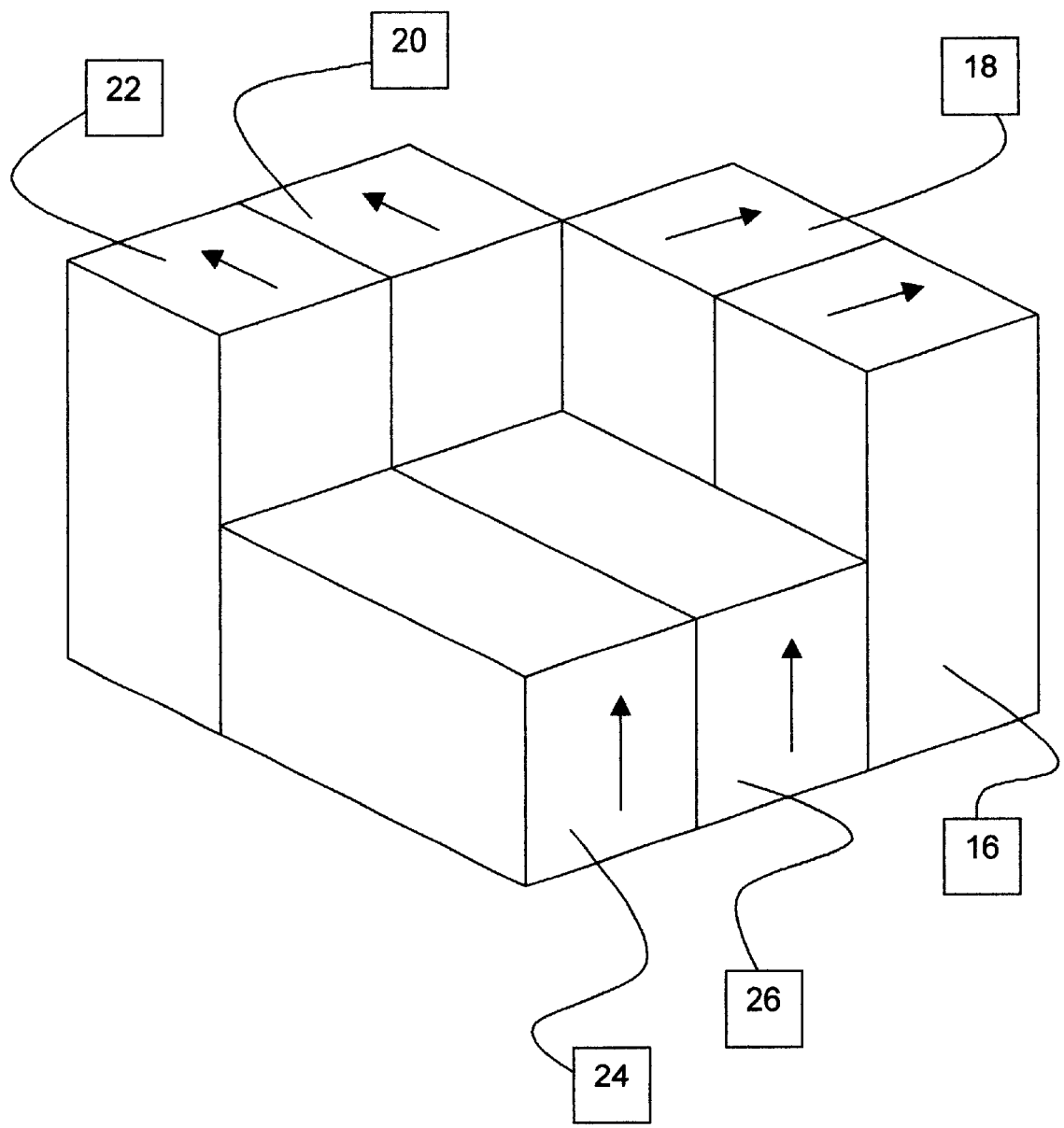
FIG. 2 is an isometric view of a three-axis combined accelerometer and magnetic field package.

FIG. 2 illustrates the basic disposition of the elements of sensor unit 12. These consist of an x-axis accelerometer 16, an x-axis geophysical field sensor 18, a y-axis accelerometer 20, a y-axis geophysical field sensor 22, a z-axis accelerometer 24, and a z-axis geophysical field sensor 26. The x-, y-, and z-axes are to be substantially mutually orthogonal to one another. In the preferred embodiment, the geophysical field sensors 18, 22, and 26 respond to three-dimensional geomagnetic field components. Although the geomagnetic field components vary considerably with geographic location, they are usually well mapped and therefore provide a known local reference direction. For example, such maps are readily available from U.S. Government sources. The accelerometers are conventional and respond to three-dimensional vehicle (aircraft) accelerations and to earth's gravity.

Figure 3:
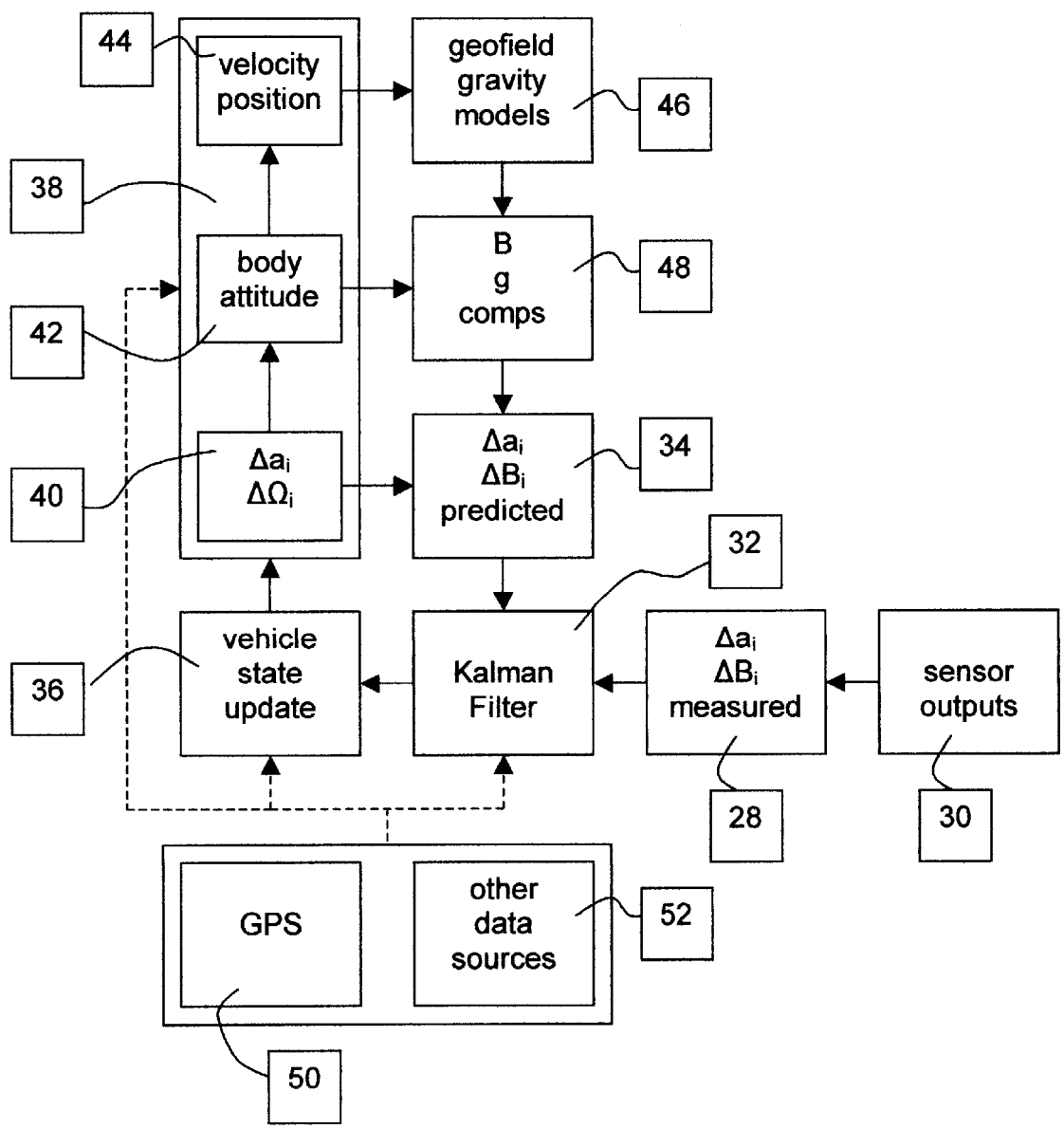
FIG. 3 is a flow diagram of a geophysical inertial navigation system.

FIG. 3 is a flow diagram that describes the basic operation of the geophysical inertial navigation system. The basic operating principle is in effect to sense vehicle (aircraft) yaw, pitch, and roll rotation changes according to their effects on the sensed geophysical (gravity and geomagnetic) field components. The measured effects or changes are compared to predicted effects or changes using a filter such as a Kalman filter. Predictive filters such as the Kalman filter and its variations statistically predict the future state of a system using previous measurements or observations and may incorporate ancillary information or data. The predicted state is compared to new state data and discrepancies are used to update the transition matrices for the next future update. As described in detail below, the novel approach employed in this present invention is the use of geomagnetic field components as state variables. Although the geomagnetic field is used to estimate or determine the orientation or attitude of the vehicle (aircraft), that particular step need not be specifically or explicitly accomplished or taken. It is both possible and useful to deal directly with sensed and predicted changes in the geomagnetic field components. This mathematical differentiation feature produces the necessary linearization step required by the Kalman filtering process. Once the orientation or attitude of the vehicle (aircraft) is estimated or determined, the outputs of accelerometers 16, 20, and 24 may be mathematically integrated once to provide velocity and direction, and then integrated once again to provide distance traveled and a new geographical position estimate, as with conventional inertial navigation systems. The new position estimate leads to a updated values for geomagnetic field direction and strength, and the process repeats itself idefinitely.

In the preferred embodiment illustrated in FIG. 3, changes in the signal outputs 28 of the acceleration and geomagnetic field sensors 30 are the measured state vector change inputs to a predictive (e.g., Kalman) filter process 32. These state vector changes are in the coordinate reference frame of the vehicle (aircraft). The measured state vector change inputs 28 are compared to predicted changes in state vector 34 to produce an update to the vehicle (aircraft) state change vector 36. Inertial or dead-reckoning navigation process 38 converts vehicle (aircraft) acceleration vector and attitude changes 36 to an external geographically based "navigation reference" coordinate system and integrates them to obtain a vehicle (aircraft) attitude estimate 42 update and a vehicle (aircraft) velocity and position vector 44 update. The vehicle (aircraft) velocity and position vector estimate 44 is used with mathematical models of the geophysical fields to update the local geophysical quantities, preferably gravity and geomagnetic field vector components 46. The updated gravity and geomagnetic field vector components 46 are converted from navigation reference to vehicle (aircraft) coordinates to obtain vehicle- (aircraft-) referenced geophysical vector components 48. The updated field components 48 are combined with the vehicle (aircraft) state update 36 to calculate the predicted state change vector 34 for the next iteration, thus completing the predictive (Kalman) filter loop. The predictive (Kalman) filter loop continues indefinitely.

Other data may be used to start, augment, update, and assist the navigation process. FIG. 3 also shows how satellite-based GPS (Global Positioning System) navigation data 50 and data from other on-board sources 52 may be fed in to affect the vehicle (aircraft) state and/or state update as well as the Kalman filter process itself. Data 50 and 52 can provide the initial or starting vehicle (aircraft) position and to set, influence, or adjust the Kalman gain matrix. Sources of data 52 include barometric altitude, rate of climb, gyroscopic turn (yaw) rate, gyroscopic pitch, gyroscopic roll, gyroscopic yaw, sun or horizon sensors, and radio-navigation devices.

In alternative embodiments, the steps described above may be combined and the order in which they are taken may be varied. It may be desirable to perform certain steps in different coordinate systems. For example, the sensor outputs 28 may be first converted from the vehicle (aircraft) coordinate system to the navigation reference coordinate system using attitude estimate 42 and the entire (Kalman)

filtering process done in the latter coordinate system. Other types of predictive filtering than the Kalman filter may be employed.

In other alternative embodiments, some of the steps may be eliminated or simplified. For example, in applications not requiring the highest accuracy, simple models of the geomagnetic field and gravity can replace the more elaborate ones based on geographical location.

Multiple magnetic field sensors may be used to cancel or minimize pickup from local sources, such as magnetized aircraft components and electrical currents.

Conclusions, Ramifications, and Scope

Accordingly, it can be seen that I have provided an inertial navigation system that senses and uses changes in the geomagnetic field to estimate the attitude and accelerations of a vehicle such as an aircraft and thus to provide a method for dead-reckoning navigation.

Although the description above contains many specificities, these should not be construed as limiting the scope of the invention but as merely providing illustrations of the presently preferred embodiments of this invention. Various other embodiments and ramifications are possible within its scope.

Thus the scope of the invention should be determined by the appended claims and their legal equivalents, rather than by the examples given.

I claim:

1. A system for inertial navigation of a vehicle comprising
   a. a means for measuring vector components of a geophysical field;
   b. a means for measuring vector components of the acceleration of said vehicle;
   c. a means for inertial navigation having as output the geographical position, velocity, and attitude of said vehicle and employing a predictive filter using as inputs:
      i. changes in said measured vector geophysical field components;
      ii. changes in predicted vector geophysical field components;
      iii. said vector components of said vehicle acceleration.
   d. a means for employing said geographical position and attitude output of said inertial navigation means to calculate said predicted geophysical field components from descriptive geophysical field data.

2. The system as recited in claim 1 wherein said geophysical field is the earth's magnetic field.

3. The system as recited in claim 1 wherein said geophysical field is the earth's gravity field.

4. The system as recited in claim 1 wherein said geophysical field is a weighted combination of the earth's magnetic field and the earth's gravity field.

5. The system as recited in claim 1 wherein said predictive filter is a Kalman filter.

6. The system as recited in claim 1 wherein said geophysical field descriptive data are calculated from one or more models for said geophysical field.

7. The system as recited in claim 1 wherein said geophysical field descriptive data are stored data.

8. The system as recited in claim 1 wherein said geophysical field descriptive data are mapped data.

9. The system as recited in claim 1 wherein said geophysical field descriptive values are a combination of stored data, mapped data, and values calculated from one or more models for said geophysical field.

10. The system as recited in claim 1 wherein the components of said geophysical field are part of said state vector.

11. The system as recited in claim 1 comprising an additional step wherein additional data are employed to augment said navigation process.

12. The system as recited in claim 11 wherein said augmentation is a navigation initialization step.

13. The system as recited in claim 11 wherein said additional data are Global Positioning System navigational data.

14. The system as recited in claim 11 wherein said additional data are a weighted combination of GPS, barometric altimeter, rate of climb, gyroscopic turn (yaw) rate, gyroscopic pitch, gyroscopic roll, gyroscopic yaw, sun or horizon sensors, and radio-navigation device outputs.

* * * * *